Figure 1:
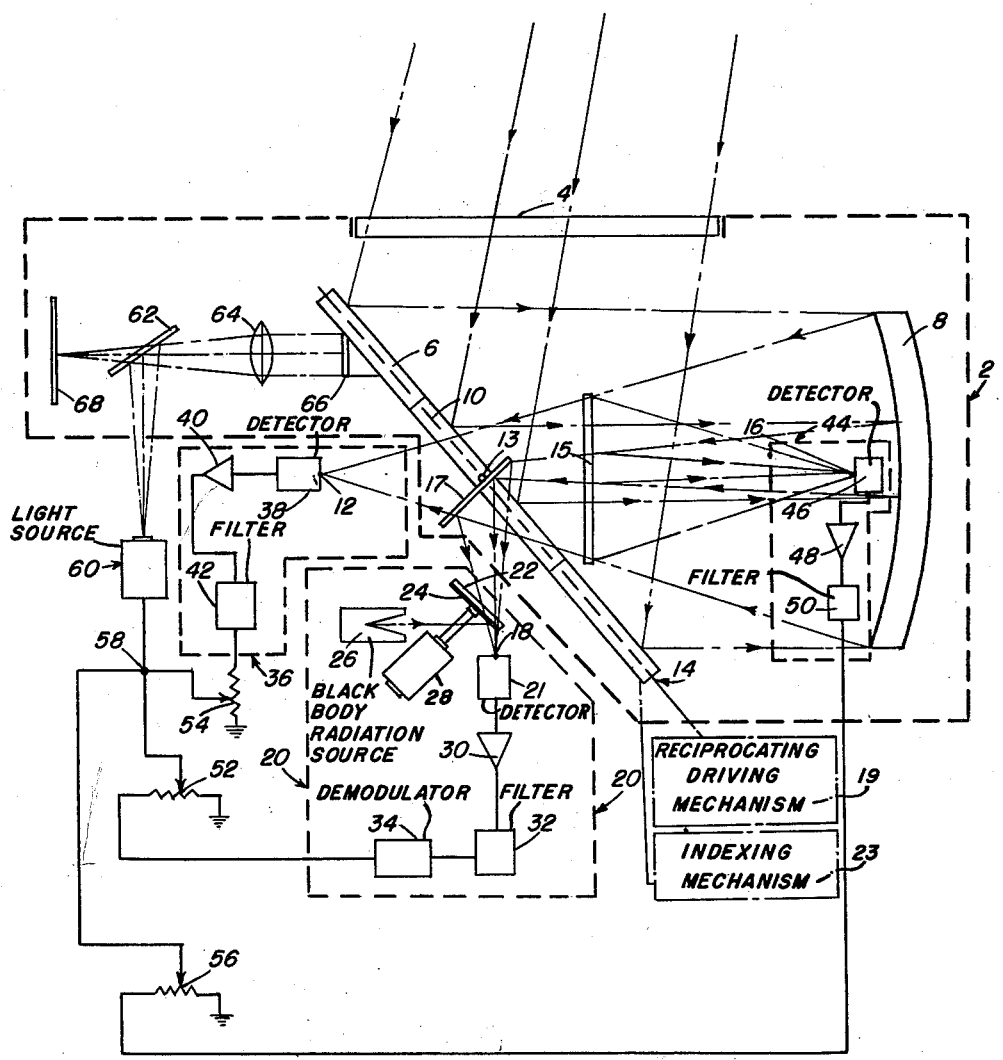

INVENTOR.
ROBERT W. ASTHEIMER.
BY
ATTORNEYS.

United States Patent Office 3,130,308
Patented Apr. 21, 1964

3,130,308
THREE DETECTOR FREQUENCY SHARING SYSTEM FOR RADIOMETERS
Robert W. Astheimer, Springdale, Conn., assignor to Barnes Engineering Company, Stamford, Conn.
Filed Nov. 19, 1956, Ser. No. 623,255
19 Claims. (Cl. 250—83.3)

This invention relates to an improved high speed thermal image scanning system. More particularly it relates to a thermal image scanning system in which a plurality of detectors are used in a frequency sharing system.

It is often desirable to obtain a "heat picture" of an object or an area thereof, for example to determine the efficiency of insulation of a house, or the "hot spots" in studying the amount of heat lost through smokestacks in industrial apparatus operating at high temperatures. Such "heat pictures," which are brightest where the temperature of the field of view is high and darkest where the temperature is low, are also useful in photographing objects obscured by darkness or fog. Film sensitive to the infra-red radiation emitted by any warm object may be used to obtain such pictures with conventional photographic techniques. However, infra-red film is not sufficiently sensitive to provide desirable pictures when the temperatures of the objects of interest are relatively low, for example 20 or 30° C., or when small differences in temperature between the ambient and a particular object are to be measured.

To provide means for obtaining "heat pictures" under these conditions, sensitive infra-red detectors have been developed which "view" only a small portion of the field to be covered. These are made to scan either optically or mechanically, over the entire field of view and the output signal therefrom is used to modulate a light beam which scans a photographic plate or film in synchronism with the infra-red detector. The picture recorded on the photographic plate or film then depicts a thermal image or "heat picture" of the field of view.

As the infra-red detector scans a field it sees relatively large areas of substantially uniform temperatures, giving rise to low frequency components in the infra-red signal, and relatively small areas which differ in temperature from adjacent areas, giving rise to high frequency components. To provide faithful reproduction of the large areas of substantially uniform temperature, i.e. to accommodate the low frequency components of the input signal, the incoming signal should be chopped, i.e. periodically interrupted, to minimize detector drift, which is low frequency in nature, and to eliminate the need for direct current amplifiers which are critical in adjustment and are also subject to similar drift. For satisfactory operation, the chopping rate should be at least four times the highest frequency component of the incoming signal; that is, the period during which the signal is interrupted should be no greater than one quarter of the time it takes the detector to scan the smallest object in the field. Otherwise a substantial portion of the object will often be missed. Also, at low chopping frequencies the boundaries between areas of high and low temperature may be displaced an inordinate amount.

The single detector systems used prior to my invention are capable of scanning a field of 12.50° by 25° in approximately one hour. As the scanning rate is increased the high frequency components of the input signals are proportionately increased so that if it is desired to scan the same field in several minutes the frequencies may be much as twenty times higher. In such a case, the chopping frequency must also be increased proportionately. However, as the chopping frequency is increased, the time constant of the thermistor bolometer generally used as the infra-red detector cannot respond to the fast on-off sequence of the chopper. This results in low sensitivity to incoming signals and low signal-to-noise ratio at the thermistor bolometer outputs. Additionally, if the scanning rate is increased as described, the detector will not respond satisfactorily even to unchopped high frequency components, resulting in loss of resolving power.

A lead telluride or lead sulphide cell having good response and high sensitivity at higher frequencies might be used, but these cells have inferior signal-to-noise ratios at lower frequencies. A multiple detector space sharing system might be used in which each detector scans a portion of the field and light beams associated with each of the detectors sweep a portion of the photographic plate. However, this results in cumbersome equipment which is very difficult to adjust to keep the various units in registry.

Accordingly, it is an object of this invention to provide a sensitive infra-red detecting system whose output provides a faithful reproduction of variations in the intensity of the incoming infra-red radiation. Another object of this invention is to provide an improved thermal image scanning method and apparatus of the above character capable of operation at high scanning speeds. Another object of this invention is to provide a method and apparatus of the above character capable of high sensitivity and signal-to-noise ratio. Yet another object of my invention is to provide a method and apparatus of the above character capable of resolving small objects. A further object of my invention is to provide a scanning apparatus of the above character capable of being incorporated in a portable unit. A final stated object of this invention is to provide a thermal image method and apparatus of the above character adapted for use by non-technical personnel without extensive training. Other and further objects of my invention will in part be obvious and will in part appear hereinafter.

The invention accordingly comprises the several steps and relation of one or more such steps with respect to each of the others, and the apparatus embodying the features of construction, combination of elements and arrangement of parts which are adapted to effect such steps, all as exemplified in the following detailed disclosure, and the scope of the invention will be indicated in the claims.

Figure 2:
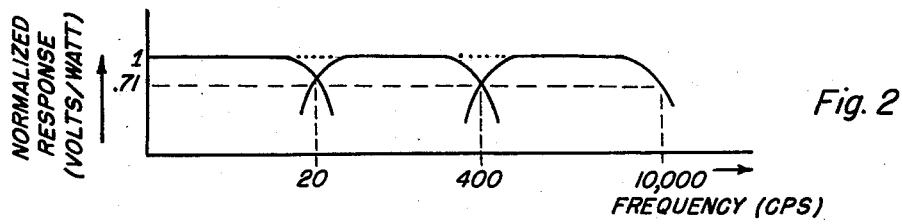
Figure 3:
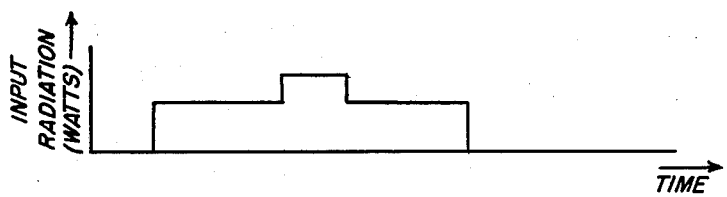
Figure 4:
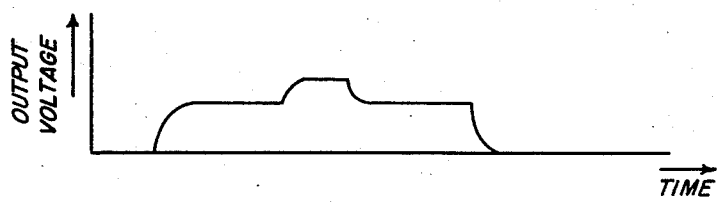
Figure 5:
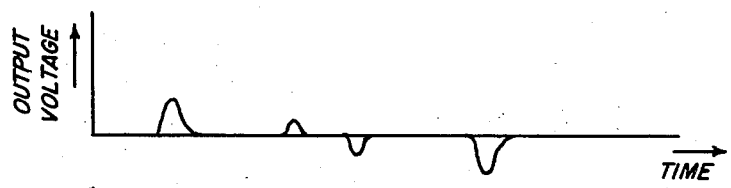
Figure 6:
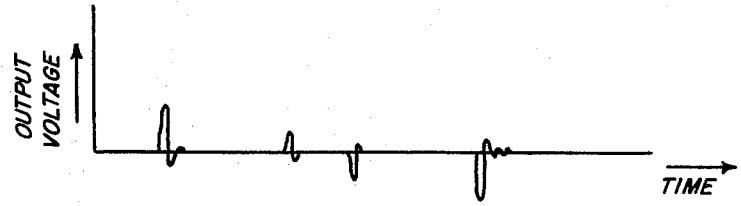
Figure 7:
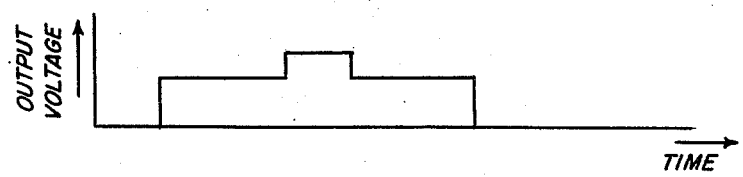

For a fuller understanding of the nature and objects of the invention, reference should be had to the following detailed description taken in connection with the accompanying drawings in which:

FIGURE 1 is a schematic top view of a typical scanning system utilizing the principles of my invention, FIGURE 2 is a graph representing the frequency response of the several detectors in the scanning system shown in FIGURE 1, FIGURE 3 is a graph representing a hypothetical input signal to the system, FIGURE 4 is a graph representing the response of the low frequency detector shown in FIGURE 1 to the signal depicted in FIGURE 3, FIGURE 5 is a graph representing the response of the middle frequency detector shown in FIGURE 1 to the same signal, FIGURE 6 is a graph representing the response of the high frequency detector also to the signal depicted in FIGURE 3, and FIGURE 7 is a graph showing the combined response of all three detectors to the hypothetical signal of FIGURE 3.

In my co-pending application entitled "Frequency Sharing System for Radiometers," Serial No. 623,254, filed November 19, 1956, now abandoned, I have described a multiple detector frequency sharing system which overcomes the deficiencies of the single detector and space-sharing multiple detector ssytems. My frequency sharing system as therein described, utilizes two radiometers accomodating different frequency bands over the range of frequencies present at the input to the system. The combined output of these radiometers, which simultaneously scan the field under view, is displayed on a photographic plate or cathode ray screen to provide a heat picture of the field. This frequency sharing system is responsible for much faster scanning speed and for increased signal-to-noise ratio. Additionally it is easier to operate and adjust, requiring less complicated equipment. To further increase scanning speed and resolving power, there is added a third radiometer having a lead telluride or lead sulphide detector to accommodate frequency components of up to 10,000 cycles per second.

Turning now to FIGURE 1, the radiation emitted from the field to be scanned enters a scanner generally indicated at 2, through an infra-red transparent window 4 which may be made of silver chloride or the like. The entering radiation then strikes plane scanning mirror 6 which reflects it toward parabolic mirror 8. These rays striking mirror 8 which are parallel to the axis thereof are reflected through an opening 10 in mirror 6 to converge at a focal point 12. As the radiation from any small point in the field being scanned will cause substantially parallel rays to be transmitted toward the scanner 2, and as only one set of these rays, i.e. the rays from only one point, will be parallel to the axis of parabolic mirror 8 after reflection by scanning mirror 6, the radiation from only one point will converge at focal point 12.

Mirror 6 is made to reciprocate about an axis diagrammatically indicated at 13 by suitable driving mechanism 19 and as it does so rays from successive points along a horizontal line of the field being scanned converge at focal point 12. After mirror 6 scans one line of the field, it is indexed about a horizontal axis diagrammatically indicated at 14 by a mechanical indexing means 23 to then scan another line substantially parallel to and adjacent the previously scanned line. Thus by this combination of reciprocatory and indexing movements mirror 6 causes the infra-red rays from each small point in the field under view to be successively converged at focal point 12.

Preferably a plane dichroic mirror 15 is disposed in the path of the rays reflected from mirror 8. Thus, mirror 15 allows transmission of the longer wavelengths of infra-red radiation to focal point 12 and reflects the shorter wavelengths to a focal point 16. Preferably, also a stationary plane mirror 17 is disposed between mirror 15 and focal point 12 to intercept a portion of radiation transmitted by mirror 15 toward focal point 12. That portion of the radiation falling on mirror 17 is reflected thereby to converge at a third focal point 18. Thus as the scanning operation takes place as described above, radiation from the same points in the scanned field will simultaneously converge at focal points 12, 16 and 18.

Still referring to FIGURE 1, a low frequency radiometer generally indicated at 20 has an infra-red detector 21, preferably a thermistor bolometer, disposed to intercept the rays converging at focal point 18. Preferably a chopping disk 22 is interposed between mirror 17 and detector 21. Disk 22 preferably has V-shaped cutouts so that upon rotation it will periodically interrupt the radiation reflected by mirror 17 toward detector 21. The rear surfaces of the segments of disk 22 are fitted with mirrors 24 whose use will be presently described. Preferably also a black body infra-red radiation source 26 in the form of a black surfaced cone at ambient temperature is positioned so that the radiation emitted therefrom is reflected toward detector 21 by mirrors 24 when they are opposite that detector.

During the operation of the system chopping disk 22, which is rotated by an electric motor 28, acts as a switch, alternately passing the incoming signal from mirror 17 to detector 21 and then reflecting the radiation from radiation source 26 to the detector by mirrors 24. Consequently there appears at the output of detector 21 an alternating voltage whose amplitude is proportional to the difference between the intensity of the radiation from the point being scanned and the intensity of the radiation from source 26, thus largely eliminating the effect of the detector drift. As the temperature of source 26 is relatively stable, this voltage is a measure of the temperature of the point in the scanned field under observation. Moreover, the output of detector 21 can be amplified by a conventional alternating current amplifier 30. Preferably, the chopping frequency should be approximately four times the highest frequency component of the input signal, and since low frequency radiometer 20 is used to accommodate the low frequencies, say those from zero to 20 cycles per second, the chopping frequency need only be 80 cycles per second, well within the sensitivity and response capabilities of detector 21.

Still referring to FIGURE 1, the output of detector 21, after being amplified by amplifier 30, is passed through a band-pass filter 32 having a pass band of from 60 to 100 cycles per second to accommodate the 80 cycles per second carrier and side bands of up to 20 cycles per second. The output of filter 32 is demodulated in a suitable demodulator 34 to translate the signal back to the frequency range of zero to 20 cycles per second.

The middle frequency radiometer generally indicated at 36 has a detector 38, preferably a thermistor bolometer whose characteristics are optimized for operation up to 400 cycles per second, disposed to intercept the rays converging at focal point 12. The output of detector 38 is amplified by amplifier 40 whose output is connected to bandpass filter 42, having cutoff frequencies of 20 and 400 cycles per second. Thus there appears at the output terminals of filter 42 a voltage corresponding to the infra-red input signal to the system and containing the middle frequency components of that signal, that is 20 to 400 cycles per second.

The high frequency radiometer generally indicated at 44 has a detector 46 positioned at focal point 16. Detector 46 is preferably a lead telluride or lead sulphide cell or other detector capable of operating at high frequencies. In addition to detector 46, radiometer 44 includes an amplifier 48 receiving the output of detector 46 and a bandpass filter 50 having cutoff frequencies of 400 and 10,000 cycles per second connected to the output of amplifier 48.

Accordingly, the zero to 20 cycle output of radiometer 20, the 20 to 400 cycle output of radiometer 36 and the 400 to 10,000 cycle output of radiometer 44 are passed through adjusting potentiometers 52, 54 and 56 respectively and combined at a junction 58.

FIGURE 2 illustrates the frequency response of each of the radiometers 20, 36 and 44. The upper cutoff or upper half power frequency of low frequency radiometer 20 corresponds to the lower cutoff frequency of radiometer 36, and thus if potentiometers 52 and 54 are adjusted so that voltages appearing at junction 58 from radiometers 20 and 36 are of the same level in the flat region of the pass bands thereof, the combined voltage in the region of overlap is also of that level, as shown by the dotted line. Similarly, the upper cutoff frequency of middle frequency radiometer 36 coincides with the lower cutoff frequency of high frequency radiometer 44 so that if potentiometer 56 is similarly adjusted, the combined response in the region of overlap between these two radiometers is flat, as shown by the dotted line portion. More particularly, the voltage responses of the three radiometers fall off at a rate of 6 db per octave in the two regions of overlap, the voltage from low frequency radiometer 20 lagging at an angle of 45° and that from middle frequency radiometer 36 leading by the same amount at the 20 c.p.s. joint half power point, and the voltage from radiometer 36 lagging by 45° and that from high frequency radiometer 44 leading by 45° at the 400 c.p.s. joint half power point. Accordingly, the combined radiometers 20, 36 and 44 comprise a system having a flat response over the entire band of frequencies which must be accommodated in order to provide an electrical signal which faithfully reproduces the input signal.

FIGURE 3 illustrates in a hypothetical input signal to the scanning system plotted as a function of time. FIGURE 4 illustrates the response of the low frequency radiometer 20 to this signal. It is seen that the response to sudden changes in intensity of radiation is poor, whereas the decay time for the radiometer is long, allowing for good reproduction of sustained levels of radiation, i.e. large areas of substantially even temperature in the field being scanned. FIGURE 5 shows that the response of middle frequency radiometer 36, to sudden changes in intensity is better than that of radiometer 20, while the reproduction of periods of sustained intensity of radiation is somewhat poorer. FIGURE 6 shows the response of high frequency radiometer 44 to the same signal. The response to sudden changes in intensity is extremely good, while the reproduction of large areas of even temperature is rather poor. FIGURE 7 illustrates the combined response of radiometers 20, 36 and 44 appearing at junction 58. The good characteristics of all three radiometers are present, thus providing faithful electrical reproduction of the incoming hypothetical signal depicted in FIGURE 3.

Turning once again to FIGURE 1, the signal appearing at junction 58 is fed to a light source generally indicated at 60 whose intensity is proportional to the magnitude of the signal. Light emitted from light source 60 is directed to a plane mirror 62 and is reflected therefrom through a focusing lens 64 to a plane mirror 66 which is affixed to scanning mirror 6 and thus oscillates and indexes therewith. Mirrors 62 and 66 are slightly tilted with respect to each other so that light reflected from mirror 66 passes back through lens 64 and above mirror 62 to focus at a point on photographic plate 68. Since mirror 66 moves with mirror 6, the light sweeps the photographic plate 68 in corresponding reciprocatory and indexing movements, so that each point swept by the light beam will correspond to a point in the field scanned by the system. Since the intensity of the light beam is proportional to the intensity of the radiation emitted from the point being scanned, there is reproduced on the plate a photographic replica of the infra-red image of the field.

In recapitulation the movement of scanning mirror 6 causes detectors 21, 38 and 46 to simultaneously scan the field of view, the detectors being elements of electrical systems which accommodate adjacent low, middle and high frequency channels. The outputs of these electrical systems or radiometers are combined at junction 58, the levels thereof being equalized by adjustment of potentiometers 52, 54 and 56. The combined signal appearing at junction 58 is used to modulate the intensity of the light emitted from light source 60, which is made to sweep photographic plate 68 in synchronism with the movement of scanning mirror 6 to produce thereon a thermal or heat image of the scanned field.

The lead telluride or lead sulphide detector 46 at focal point 16 is highly sensitive to short wavelengths radiation but relatively insensitive to long wavelength radiation and detectors 21 and 38 are highly sensitive to the longer wavelengths. Thus the use of dichroic mirror 15, which reflects only the short wavelengths toward point 16 while allowing the longer wavelengths through to detectors 21 and 38 prevents waste of incoming energy. Detectors 21 and 38 may be "tailored" to have optimum characteristics over the frequency ranges in which they operate, i.e. 60 to 100 and 20 to 400 cycles per second respectively. Also mirror 17 is preferably arranged to intercept so much of the radiation transmitted by mirror 15 as will equalize the signal-to-noise ratios of detectors 21 and 38 to optimize the signal-to-noise ratio of the entire system.

Thus I have described a method and apparatus for thermal image scanning which operates to detect the incoming signal with three radiometers accommodating different frequency bands. This frequency sharing system, which may be used with any scanner capable of splitting the incoming infra-red radiation into three parts, permits the use of detectors which are tailored for the particular frequencies on which their radiometers operate, and eliminates the need for high speed chopping. The combined radiometers produce a true picture of the temperature distribution in the field being scanned which can be displaced on a photographic film, a cathode ray tube or other suitable means. Moreover, by using a dichroic mirror to separate out the input to the high frequency detector and by adjusting the relative amount of radiation impinging on the low and middle frequency detectors responsivity and noise characteristics are thus optimized to enable the system to operate at high scanning rates with good response to signal-to-noise ratio.

It will thus be seen that the objects set forth above, among those made apparent from the preceding description, are efficiently attained and, since certain changes may be made in carrying out the above process and its construction set forth without departing from the scope of the invention, it is intended that all matter contained in the above description or shown in the accompanying drawings shall be interpreted as illustrative and not in a limiting sense.

It is also to be understood that the following claims are intended to cover all generic and specific features of the invention herein described, and all statements of the scope of the invention which, as a matter of language, might be said to fall therebetween.

I claim:

1. In apparatus for thermal image scanning of a field utilizing an input radiation scanning mechanism including a movable scanning element, the combination of three infrared sensitive detecting systems responsive respectively to three different bands of component frequencies of received thermal radiation intensity variations, a radiation-divider for directing said radiation from said radiation scanning mechanism to each of said detecting systems, a converting system constructed to combine the output signals of said detecting systems and convert said signals into corresponding light energy, a display system including a display screen for displaying said light energy, and a light-directing element connected to said movable element to move synchronously therewith, said light directing element being positioned to direct said light energy to said display screen whereby a light image corresponding to said thermal image is created.

2. The combination defined in claim 1 in which said different frequency bands of thermal radiation intensity variations are substantially adjacent bands and in which the corresponding light energy directed to said display system includes frequency components from each of said adjacent frequency bands.

3. The combination defined in claim 1 in which one of said infrared sensitive detecting systems is responsive to a low frequency band of received thermal radiation intensity variations and includes a black-body infrared radiation source, and in which a chopping mirror is mounted to expose said detecting system alternately to said received radiation and to radiation from said black-body radiation source.

4. The combination defined in claim 1 in which each of said detecting systems includes an output filter for passing one of said different frequency bands.

5. The combination defined in claim 1 in which the first of said infrared sensitive detecting systems is responsive to a low frequency band of received thermal radiation intensity variations, the second of said detecting systems is responsive to an intermediate frequency band of received thermal radiation intensity variations, and the third of said infrared sensitive detecting systems is responsive to a high frequency band of received thermal radiation intensity variations, the upper half-power frequency of the first of said detecting systems being about the same as the lower half power frequency of the second of said systems, and the upper half-power frequency of the second of said detecting systems being about the same as the lower half power frequency of the third of said systems.

6. In apparatus for thermal image scanning of a field utilizing an input radiation scanning mechanism including a movable scanning element, the combination of three infrared sensitive detecting systems each responsive to a different band of component frequencies of received thermal radiation intensity variations to produce output signals corresponding thereto, each said system including an infrared sensitive detector; an input scanning system including a parabolic mirror and a scanning mirror, said scanning mirror being actuated by said movable element and being positioned to receive incident radiation from the field being scanned and to reflect said radiation toward said parabolic mirror, said scanning mirror also being mounted to reciprocate about one axis to cause incident radiation from successive points along a line of the field being scanned to be converged at a first focal point of said parabolic mirror and to index about an axis perpendicular to said first mentioned axis and thereby to cause radiation from points in successive lines parallel to said first line to be successively converged at said first focal point, two mirrors disposed between said parabolic mirror and said first focal point, said mirrors being positioned to reflect portions of the radiation reflected by said parabolic mirror respectively to a second focal point and to third focal point, said three infrared sensitive detecting systems having their detectors positioned respectively at said three focal points, whereby each of said systems receives radiation simultaneously from the same successive portions of the field under view; a combining circuit for uniting the output signals produced by each of said detecting systems; a source producing light energy which is intensity modulated in response to said combined output signals; a display system positioned to receive and display said light energy; and a light-directing element connected to said movable scanning mirror to move in synchronism therewith, said light-directing element being positioned to direct said light energy in a scanning pattern to said display system, whereby a light image corresponding to said thermal image is produced.

7. In apparatus for thermal image scanning of a field utilizing an incident radiation scanning mechanism including a movable scanning element, the combination of three infrared sensitive detecting systems, each including an infrared sensitive detector responsive to a different band of incident intensity variation frequencies and each producing output signals respectively corresponding to said different bands of component frequencies of incident thermal radiation intensity variations, an input scanning system actuated by said movable element and positioned to direct said incident radiation from successive portions of said field to each of said systems simultaneously, and a display system for displaying the combined output signals of said detecting systems including a light source producing light which is intensity-modulated by said combined output signals from said systems, a photographic plate, and a light-directing element connected to said movable scanning element to move synchronously therewith to direct said light to different successive portions of said plate corresponding to said successive portions of said field, whereby a light image corresponding to said thermal image is formed on said plate.

8. In apparatus for detecting and measuring variations in the intensity of external thermal radiation incident thereon, the combination of three infrared sensitive detecting systems each responsive to three different, non-overlapping bands of component frequencies of said incident thermal radiation intensity variations to produce output signals corresponding thereto, a radiation-divider directing said incident radiation to each of said detecting systems, a junction circuit for combining said output signals to unite the respective frequency bands of said detecting systems, and a display system connected to said junction circuit and responsive to said combined output signals, whereby said intensity variation components having frequencies within any of said bands can be detected and measured.

9. The combination defined in claim 6 in which one of said two mirrors is a dichroic mirror adapted to transmit low frequency components of said incident radiation while reflecting the higher frequency components toward said third focal point.

10. In apparatus for thermal image scanning of a field utilizing an input radiation scanning mechanism including a moveable scanning element, the combination of a plurality of infrared sensitive detecting systems, each responsive to different bands of component frequencies of received thermal radiation intensity variations to produce output signals corresponding thereto, a radiation-divider for directing said radiation from said radiation scanning mechanism to each of said detecting systems, a converting system constructed to combine the output signals of said detecting systems and convert said signals into corresponding light energy, a display system for displaying said light energy, and a light-directing element connected to said movable element to move synchronously therewith, said light-directing element being positioned to direct said light energy said display system, whereby a light image corresponding to said thermal image is created.

11. The combination defined in claim 10 in which said different component frequency bands of thermal radiation intensity variations are substantially adjacent bands and in which the corresponding light energy directed to said display system includes frequency components from each of said adjacent frequency bands.

12. The combination defined in claim 11 in which one of said infrared sensitive detecting systems is responsive to a low frequency band of component frequencies of received thermal radiation intensity variations and includes a black-body infrared radiation source, and in which a chopping mirror is mounted to expose said detecting system alternately to said received radiation and to radiation from said black-body radiation source.

13. The combination defined in claim 10 in which each of said detecting systems includes an output filter for passing one of said different component frequency bands.

14. The combination defined in claim 10 in which the first of said infrared sensitive detecting systems is responsive to a low frequency band of component frequencies of received thermal radiation intensity variations and the second of said infrared sensitive detecting systems is responsive to a higher frequency band of received thermal radiation intensity variations, the upper half-power frequency of the first of said systems being substantially the same as the lower half-power frequency of the second of said systems.

15. In apparatus for detecting and measuring variations in the intensity of external thermal radiation incident thereon, the combination of a plurality of infrared sensitive detecting systems, each responsive to different non-overlapping bands of component frequencies of said received thermal radiation intensity variations to produce output signals corresponding thereto, a radiation-divider directing said incident radiation to each of said detecting systems, a junction circuit for combining said output signals to unite the respective component frequency bands of said detecting systems, and a display system connected to said junction circuit and responsive to said combined output signals, whereby said intensity variation having frequency components within any of said bands can be detected and measured.

16. The combination defined in claim 15 including a changing system for converting said combined output signals into corresponding light signals, and in which said display system includes a screen for viewing said light signals.

17. The combination defined in claim 15 including a changing system for converting said combined output signals into corresponding light signals, and in which said display system includes a recorder for said light signals.

18. In apparatus for detecting and measuring variations in the intensity of external radiation incident thereon, the combination of a plurality of detecting systems, each including an infrared sensitive electrical element responsive to a different band of component frequencies of said incident infrared radiation intensity variations and producing output signals corresponding thereto, a radiation-divider directing said incident radiation to each of said sensitive elements, each of said detecting systems including a filter for passing a different band of said component frequencies, a junction circuit for combining said output signals to unite the respective bands of said detecting systems, and a display system connected to said junction circuit and responsive to said combined output signals, whereby said intensity variation components having frequencies within any of said bands can be detected and measured.

19. The combination defined in claim 15 in which one of said different intensity variation component frequency bands is a low frequency band and the one of said detecting systems responsive to said low frequency band includes a black-body radiation source, and a chopping mirror mounted to expose the sensitive element of said one detecting system alternately to radiation from said blackbody radiation source and to said incident external radiation, and in which said low frequency band detector system includes a demodulator interposed between its infrared sensitive element and said junction circuit, whereby said low frequency components of incident radiation intensity variations are separated from signal fluctuations caused by the operation of said chopping mirror.

References Cited in the file of this patent

UNITED STATES PATENTS

| | | |
|---|---|---|
| 1,762,470 | Crowe | June 10, 1930 |
| 2,403,066 | Evans | July 2, 1946 |
| 2,497,129 | Liston | Feb. 14, 1950 |
| 2,742,550 | Jenness | Apr. 17, 1956 |
| 2,779,811 | Picciano et al. | Jan. 29, 1957 |
| 2,848,626 | Brackmann | Aug. 19, 1958 |
| 2,903,204 | Nyman | Sept. 8, 1959 |

UNITED STATES PATENT OFFICE
CERTIFICATE OF CORRECTION

Patent No. 3,130,308                                                 April 21, 1964

Robert W. Astheimer

It is hereby certified that error appears in the above numbered patent requiring correction and that the said Letters Patent should read as corrected below.

Column 1, line 67, after "be" insert -- as --; column 2, line 72, for "ssytems" read -- systems --; column 6, line 11, for "displaced" read -- displayed --; column 8, line 29, after "energy" insert -- to --; line 37, for the claim reference numeral "11" read -- 10 --; same column 8, lines 54 and 55, for "frequancy" read -- frequency --.

Signed and sealed this 17th day of November 1964.

(SEAL)
Attest:

ERNEST W. SWIDER
Attesting Officer

EDWARD J. BRENNER
                                                       Commissioner of Patents